United States Patent [19]

Seidl

[11] Patent Number: 4,906,316

[45] Date of Patent: Mar. 6, 1990

[54] METHOD FOR PRINTING ON A SUBSTRATE BY HOT-STAMPING

[75] Inventor: Maximilian R. Seidl, Munich, Fed. Rep. of Germany

[73] Assignee: Avery International Corporation, Pasadena, Calif.

[21] Appl. No.: 309,941

[22] Filed: Feb. 9, 1989

Related U.S. Application Data

[63] Continuation of Ser. No. 188,634, May 2, 1988, abandoned, which is a continuation of Ser. No. 791,694, Oct. 28, 1985, abandoned.

[30] Foreign Application Priority Data

Feb. 2, 1984 [DE] Fed. Rep. of Germany ....... 3440131
May 11, 1985 [EP] European Pat. Off. ...... 85 105 800.8

[51] Int. Cl.⁴ ......................... B44C 1/17; B32B 31/20; B41J 27/12; B41J 31/14

[52] U.S. Cl. .................................... 156/234; 156/230; 156/309.9; 400/121; 400/124; 101/93.01

[58] Field of Search ............... 156/230, 234, 238, 239, 156/240, 277, 272.2, 309.9, 320, 82, 249; 101/93.01, 93.04, 93.05, 93.47, 288; 400/121, 124, 120, 198, 247, 679, 687; 427/146, 148, 153; 428/486, 200, 202, 346, 488, 915, 914

[56] References Cited

U.S. PATENT DOCUMENTS

| | | | |
|---|---|---|---|
| 4,039,065 | 8/1977 | Seki et al. | 400/121 |
| 4,086,112 | 4/1978 | Porter | 156/238 |
| 4,096,314 | 6/1978 | Cespon | 428/486 |
| 4,140,907 | 8/1978 | Oba | 400/121 |
| 4,475,975 | 10/1984 | Talley et al. | 156/234 |
| 4,577,983 | 3/1986 | Aviram et al. | 400/120 |
| 4,580,144 | 4/1986 | Calvi | 400/120 |
| 4,590,485 | 5/1986 | Uramoto | 400/120 |

OTHER PUBLICATIONS

Markem Carrier-Spec. Sheet 6/1978 for "300" series and 630 series.

*Primary Examiner*—Michael W. Ball
*Assistant Examiner*—Louis Falasco
*Attorney, Agent, or Firm*—Christie, Parker & Hale

[57] ABSTRACT

For the permanent printing of a substrate with fixed and/or variable data, a hot blocking-foil having a heated pigment surface, together with the substrate to be printed, is led through a stamping station in which pigment indicia are serially transferred by action of a print head towards a pressure-receiving surface, between which the heated pigmented foil and substrate are passed.

24 Claims, 4 Drawing Sheets

METHOD FOR PRINTING ON A SUBSTRATE BY HOT-STAMPING

CROSS-REFERENCE TO RELATED APPLICATIONS

This application is a continuation of Ser. No. 188,643 filed 5/2/88, now abandoned which is a continuation of Ser. No. 791,694, filed 10/28/85 now abandoned.

BACKGROUND OF THE INVENTION

In many branches of industry, labels or identification plates are needed for the marking of products. Examples are the producers of textiles and the producers of electrical/electronic apparatus. The former provide their woven and nonwoven materials with labels which are to give the user information about sizes and instructions regarding cleaning, washing-temperatures and the like. The latter must provide their products with serial numbers and other variable relevant product information. Such users of labels, identification plates and the like, repeatedly demand the fulfillment of two conditions which the art has not to date been able to satisfy with available printing systems. The two conditions are permanency of print and the ability to rapidly alter variable data to be printed.

Depending upon the use, labels must be able to withstand relatively rough treatment processes, e.g., frequent washing and chemical agents. The same is true of identification plates which are cleaned by such agents. Nevertheless, it is expected that the respective information carriers will remain readable over long periods of time.

Another problem is the formation of variable data on the identification carriers. Identification plates, for example, carry regularly consecutive numbers, with the consequence that every identification plate is actually an original. Variable data also occur in the case of textile marking, for example, in the case of the specification of product batches or lots, and data about color and size.

It is clear that, in the mass production of identification plates and labels, what must be striven for is to produce rapidly and without problems, the selectively marked carrier.

In the case of the production of marked textile carriers with variable data, work is done today preponderantly with needle printers. They transfer the data delivered to them from a computer serially or line-by-line by needle pressure heads onto the substrate employing colored or carbon ribbons. They do not, however, produce a particularly clean impression and, above all, do not deliver an imprint which is satisfactorily resistant to washing and cleaning. The pigments available are comparatively easy to wash out or may fade, under certain circumstances. This method of printing is altogether unusable for the printing of textile labels of comparatively open weave, because the comparatively-liquid ink runs. In sum, the problem-free printing of variable data by this method of printing, where usable, is accompanied by deficient permanence of the impression. The opposite of this method is printing by hot-stamping, which delivers indicia to carriers that are resistant to washing and cleaning, and of outstanding quality, and for which shades and qualities of color are available in extraordinary abundance. But, in the case of this method of printing, the changing of data is time-consuming. In this operation the printed image is applied to the substrate which is to be printed, by means of a type block or stereotype plate. Where the data are variable, the blocks, or, respectively, the stereotype plates, must be changed every time the data are changed.

The present invention is directed to a method of printing, together with a printing system, which combines permanence with the ability to cheaply and automatically print variable data.

SUMMARY OF THE INVENTION

The present invention provides a method, together with apparatus, for printing on a substrate by hotstamping, in which the substrate and blocking-foil, provided with a layer of pigment, the layer of pigment being transferable under contact pressure when heated, and lying opposite, and facing, the surface of the substrate which is to be printed, are fed together through a stamping station in which the substrate and pre-heated blockfoil are pressed together between a pressure-reaction member and a stamping member or printer with serial transfer of pigment as indicia onto the substrate occurring by the applied stamping force. The indicia are normally dots or characters applied one after another. The pigment is at a temperature at which transfer will occur, normally at a temperature directly below its melting point.

It is preferable that the pigment-free surface of the blocking-foil be brought, in the stamping station, into contact with a pressure-reaction member which also heats the foil.

It is essential that the blocking-foil be preheated on its feedpath immediately before reaching the stamping station while the substrate in the stamping station is guided into contact, by its rear face which remains unprinted, with the pressure-reaction reaction member, which is optionally heated. It is desired to also heat the surface of the substrate to contact the pigment, to prevent chilling, thereby maximizing adhesion of the transferred indicia.

While, in the case of conventional printing by hot-stamping, the printing block was heated and was pressed onto the pigment-free surface of the blocking-foil which in turn bore through the substrate against the pressure-reaction member, the procedure is now the opposite. The heat necessary for the transfer of the pigment onto the substrate is introduced through preheating into the layer of pigment and, if desired, through the heated pressure-reaction member, so that the user becomes free in the design of the printer and can use mechanisms which are sensitive to heat such as, for example, needle-printing heads or a number wheel mechanisms, instead of or respectively in addition to, the stereotype plate. While the advantages of printing by hot-stamping are completely preserved, the advantages of the needle-printing method are added to them.

A preferred device for the performance of the method in accordance with the invention, is one in the stamping station on the side adjacent the rear face of the substrate, where a printer head is arranged and lies opposite a heated pressure-reaction member, which provides a pressure-receiving surface and an additional heating element lying in the stamping station in contact with the blocking-foil.

Alternatively, the pigment-free surface of the blocking-foil may be acted on by the printer, and the substrate is also in contact with the pressure-reaction member, which is heated, if necessary, and a heating element is arranged in contact with the blocking-foil in a region leading to the stamping station.

It may be emphasized that the suitability of a fundamentally heat-sensitive printer head has proved to be functional, by bearing in mind that the printing block, in the case of conventional hot-stamping, has a dwell against the foil of about one-tenth of a second, while, in the case of the transfer of the stamping force, dot-by-dot by means of a printer, a contact time is in the order of magnitude of only one-thousandth of a second.

The Drawings

DETAILED DESCRIPTION

Figure 1:
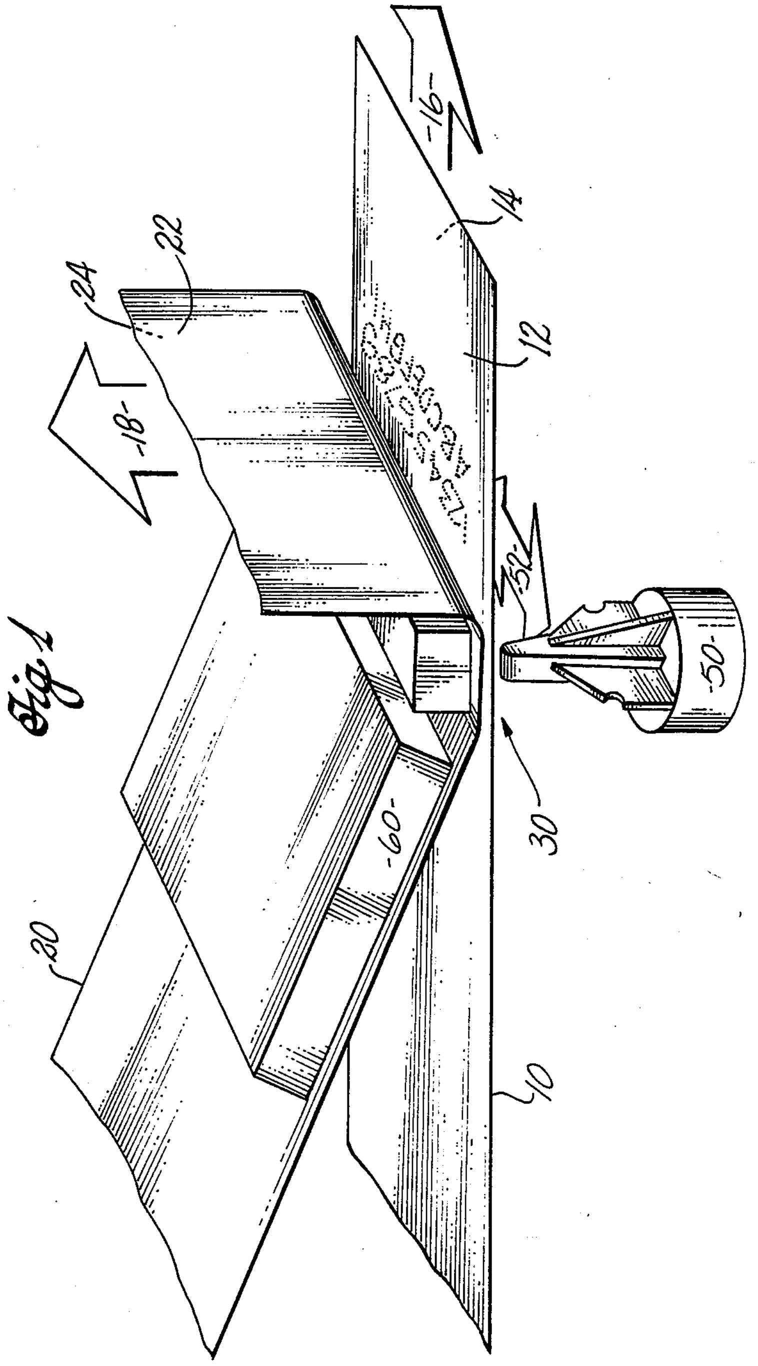
FIG. 1 is a perspective of a first embodiment of the invention in which the printing head is arranged on the side adjacent the rear face of the substrate which remains unprinted.
Figure 2:
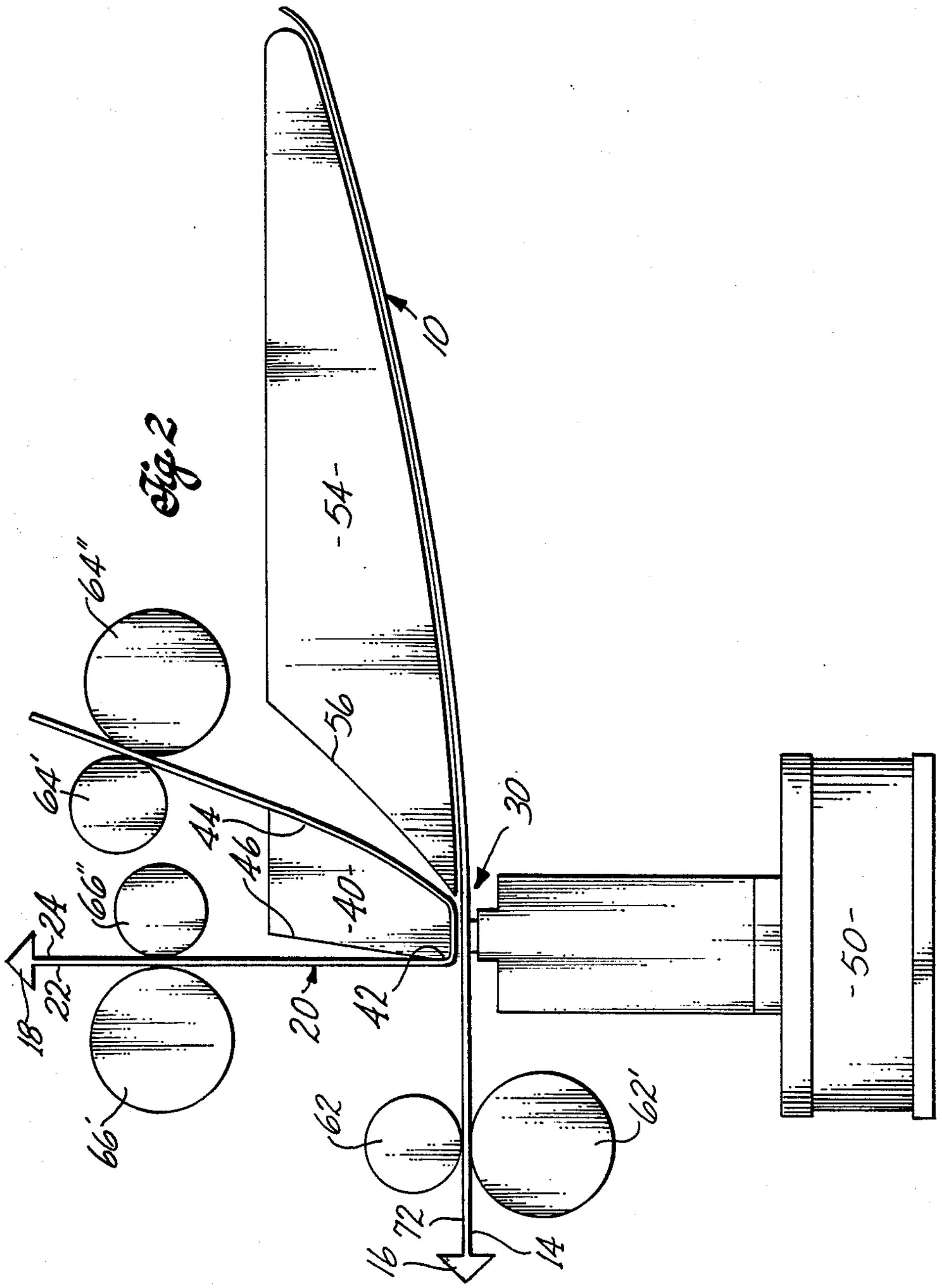
FIG. 2 is a diagramatic side elevation of the first embodiment.

With reference to FIGS. 1 and 2, substrate 10, which is to be printed, and a conventional blocking-foil 20 are fed together to a stamping station or zone 30 which is defined on one side by a pressure-reaction member 40 in the form of a pressure-receiving beam or block, and on the other side by an indicia-forming printer 50, preferably having a needle or dot-forming printing head.

The substrate has a top surface 12 which is to be printed and a rear face 14. In this embodiment, the needle-printing head of printer 50 is on the side of the rear face 14 of the substrate 10 and can be moved to and fro transversely to the direction of feed of the substrate in a path of motion indicated by an arrow 52, in a machine frame (not shown). The direction of feed of the substrate through the stamping station 30 is indicated by arrow 16. Conveyance of the substrate 10 and blocking-foil 20 in the region of the stamping station 30 are interrupted briefly during the actual printing process.

The blocking-foil 20 is provided on the side opposite and facing surface 12 of substrate 10 with a conventional layer of pigment 22 which is transferrable under contact pressure when sufficiently heated. On top of this layer of pigment there is provided in known manner a blocking layer (not shown) and on top of this, a carrier foil. The exposed surface of the carrier foil forms the surface of blocking-foil 20 opposite pigment surface 22 and is designated in the drawing by 24.

On its way to stamping station 30, blocking-foil 20 passes through a preheating zone which, in the embodiment, consists of a heated metal plate 60 contacting surface 24 of blocking-foil 20. In the illustration in accordance with FIG. 1, the metal plate 60 is a separate member. However, it may be connected in heat-conductive relation to pressure-receiving member 40, and even be made in one piece with it, in which case the gap illustrated to exist between members 60 and 40 is omitted.

The heating element, or respectively the metal plate 60, is dimensioned transverse to the direction of feed 18 of blocking-foil 20, to such a size that the pigment layer may be preheated across the whole range of the path of motion 52 of printing head 50. In the direction of feed of the blocking-foil, heating element 60, taking into consideration its temperature, has a length such that the pigment, upon reaching pressure beam 40, has been heated to the extent that, in the case of the stamping force being applied in the form of a dot or character by printer 50, is transferred cleanly from the blocking-foil onto substrate 10, which is also preferably heated, to enhance bonding of the indicia.

Thermostatic regulators (not shown) are associated with heating element 60 and pressure-reaction member 40 for the maintenance of the temperatures needed, and it may be provided that the whole heating regions 60 and 40 are divided up into zones at different temperatures.

FIG. 2 shows a side elevation of a presently preferred embodiment of the hot-stamping system illustrated in FIG. 1. For the sake of clarity here, too, and in the remaining FIGS., the machine frame, driving mechanisms, and electrical/electronic devices have been omitted as such components are old in the art and lay within the field of knowledge of a person trained in the design and operation of printing machines and hot-stamping devices.

The direction of feed 16 of substrate 10 runs in FIG. 2 from right to left. Substrate 10 is drawn off from a stock reel supported in the machine frame (not shown) by means of a pair of conveyor rollers 62', 62'', which lie behind the stamping station 30 in the direction of feed and, in case of need, may be assisted by a further pair of conveyor rollers in front of the stamping station in the direction of feed. Substrate 10, consisting in the usual way of a sheet of textile material or metalized plastic foil, is led in front of stamping station 30 along a slightly curved surface of a guide body or member 54 and in contact with this surface. In the embodiment, guide body 54 is heated and its temperature regulated thermostatically.

Blocking-foil 20 is drawn off by means of a pair of conveyor rollers 64' and 64'' from a stock reel (not shown) supported in the machine frame (not shown). After passing between conveyor rollers 64' and 64'', blocking-foil 20 comes into contact with a slightly curved surface 44 on pressure-reaction member 40; at the end of surface 44 is deflected into stamping station 30 to run there in parallel with substrate 10; passes at the end of stamping station 30 around deflector edge 42 on pressure beam 40; and runs thence at a distance from surface 46 on pressure-reaction member 40 approximately perpendicular to the direction of feed 16 of substrate 10 to a further pair of conveyor rollers 66' and 66'', which, just like all of the other pairs of conveyor rollers, are driven.

Through the orientation of curved surface 44 with respect to the position of conveyor rollers 64' and 64'', and through the pull exerted by further conveyor rollers 66' and 66'', blocking-foil 20 is kept in close contact with curved surface 44 as far as deflector edge 42, and heated up by pressure-reaction member 40. As also in the illustration in accordance with FIG. 1, the heating of blocking-foil 20 takes place from its exposed surface 24.

Additional heating of blocking-foil 20, as evidenced by FIG. 2, may be carried out through radiation of heat from surface 56 of guide body 54 to layer 22 of pigment on blocking-foil 20. Surface 56, together with surface 44, forms a V-shaped angle or gap, which tapers in the direction towards stamping station 30. The reduction in the spacing of surface 56 from layer of pigment 22, leads to an increase in the heat of radiation striking layer of pigment 22 from surface 56, until directly before reaching stamping station 30. The amount of this heat of radiation may be varied not only through a variation of the temperature of guide body 54, but also by guide body 54 being arranged in the machine frame to be able to be shifted as a whole in parallel with the direction of feed 16. It may also be achieved through an adjustable position of guide body 54 in its machine frame such that the angle of the "V" gap between surfaces 44 and 56 can be altered.

The heating of blocking-foil 20 in the region of pressure-reaction member 40 leads to a stretching of blocking-foil 20 in the direction of feed 18. In order to ensure that blocking-foil 20 nevertheless always rests tight against pressure beam 40 and is guided free of flutter over deflector edge 42, it is provided that the circumferential speed of conveyor rollers 66′ and 66″ is slightly higher than that of conveyor rollers 64′ and 64″. In practice, a difference in the circumferential velocities of about 0.5% has proved quite suitable. Finally, with respect to the importance of deflector edge 42, attention may again be called to the fact that it must lie in the direction of feed as closely as possible behind the needle head of printer 50. In this way, blocking-foil 20 is drawn away from substrate 10 right after the production of the indicia printed by printer block 50. In consequence, sticking of the blocking-foil to the substrate in the region of the printed indicia or image thereby cannot occur, despite the fact that the pigment at this point is still adequately soft for sticking to occur.

The embodiment described hitherto will preferably be used when the substrate does not exceed a certain thickness and when printer block 50 used has a comparatively high sensitivity to heat.

Figure 3:
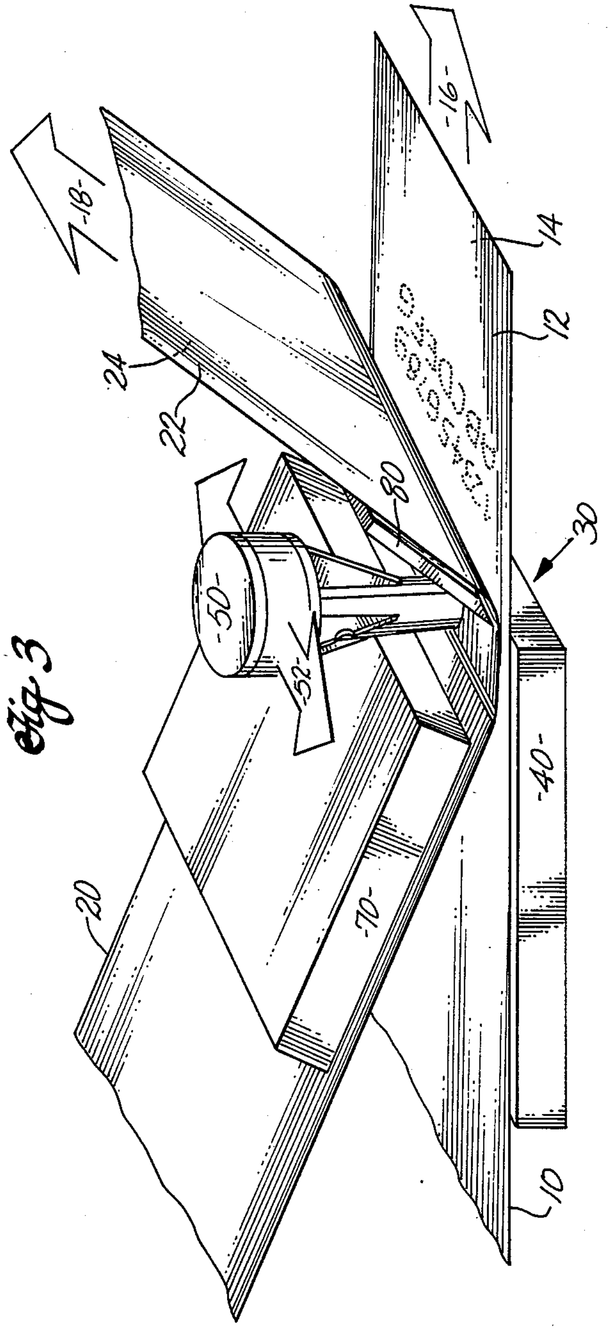
FIG. 3 is a perspective of a second embodiment, in which the printing head is arranged on the side adjacent the pigment-free surface of the blocking foil.
Figure 4:
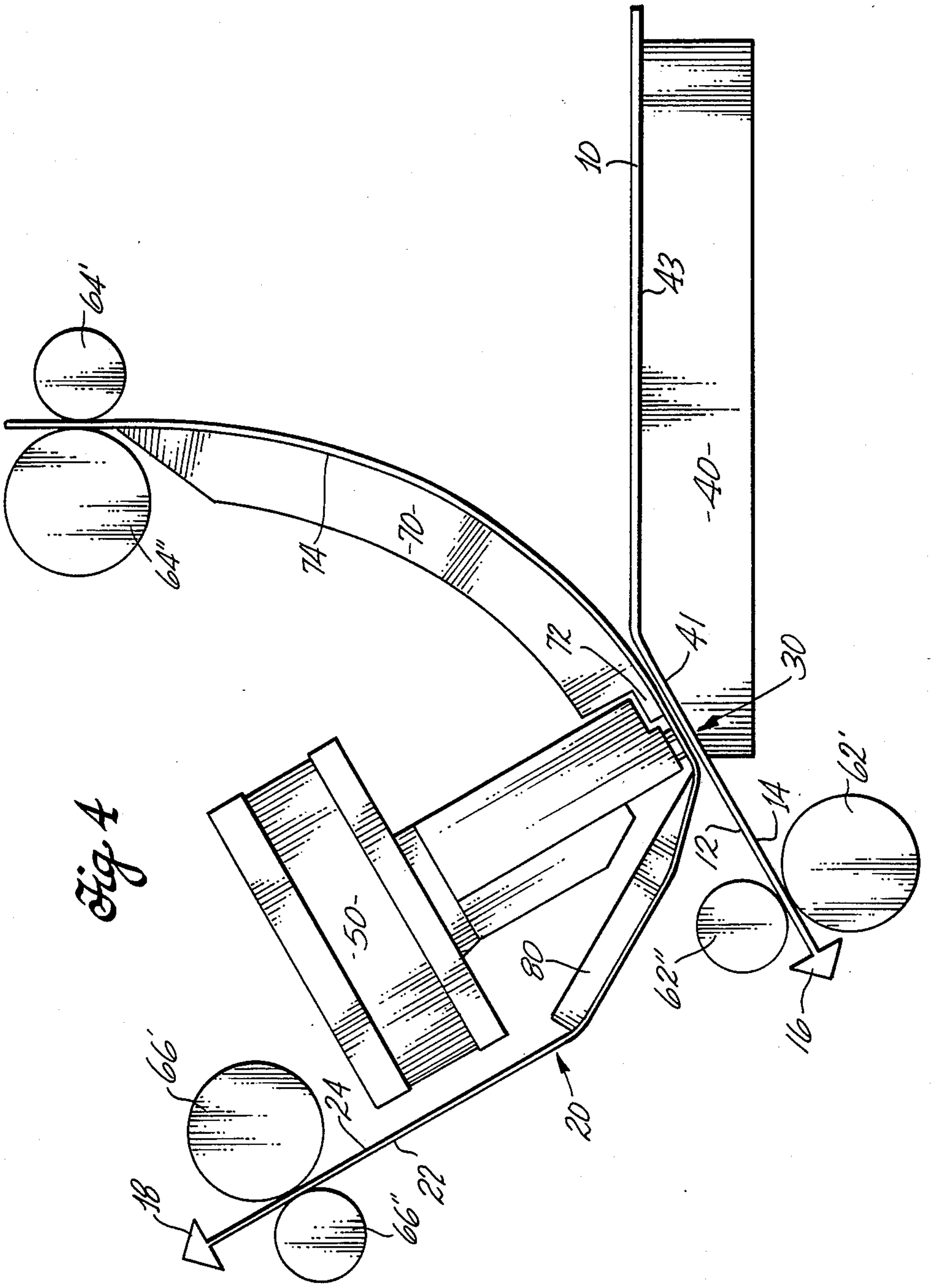
FIG. 4 is an elevation, corresponding with FIG. 2, of the second embodiment.

The embodiment in accordance with FIGS. 3 and 4 essentially differs from the first embodiment only in that the positions of printer 50 and pressure-reaction member 40, with respect to substrate 10 and blocking-foil 20, are reversed. In the description of the second embodiment, the same reference numbers as in the first embodiment are employed as much as possible. Insofar as nothing to the contrary is said below, all of the statements hereinabove are relevant, obviously or identically, to the second embodiment.

In the second embodiment, and with reference to FIGS. 3 and 4, the substrate which is to be printed is guided in the direction of feed 16 through stamping station 30 with its rear face 14 lying on pressure-reaction member 40. The pressure-reaction member in this embodiment is represented diagramatically as a slab elongated in the direction of feed 16 which may be heated and its temperature can be thermostatically regulated. As the illustration in FIG. 3 shows, slab-shaped pressure beam 40 ends in the direction of feed 16 at the end of stamping station 30.

Blocking-foil 20 is fed to stamping station 30 at an angle ("V") so that the blocking-foil and the substrate meet only at stamping station 30, or just before it. Layer of pigment 22 on blocking-foil 20 lies opposite or facing substrate 10, and blocking-foil 20, on the way to stamping station 30, makes contact by its exposed surface 24 with heating element 70, which is brought as close as possible up to stamping station 30, and extends away from stamping station 30 in the direction opposite the direction of feed of blocking-foil 20 for a distance which is adequate for optimum heating of the blocking-foil. Heating element 70, touching blocking-foil 20, is again equipped with at least one heater cartridge, the emission of heat from which is thermostatically regulated.

In this embodiment, stamping station 30 is defined by the last portion of pressure-reaction member 40 in the direction of feed 16 and printing block 50 lying opposite this portion. FIGS. 3 and 4 show that the stamping process in this embodiment is performed from exposed surface 24 of blocking-foil 20. Since the stamping force, which is exerted, for example, by the needles of a needle-printing head forming printer 50, only as to overcome the very thin carrier foil, and the likewise very thin blocking layer of blocking-foil 20, before it reaches the layer of pigment on the blocking-foil, the thickness of substrate 10 which is to be printed, as well as the material of it, no longer play any part towards a quantitatively excellent printed image.

In order to exclude the problem of adhesion between blocking-foil 20 and substrate 10 after the printing process, in the embodiment in accordance with FIGS. 3 and 4, a sharp deflection of blocking-foil 20 out of its direction of motion within stamping station 30, is again carried out. For this purpose, there is provided in the direction of feed 16 directly following stamping station 30, a knife beam 80, the comparatively sharp edge of which is analagous to deflector edge 42 of the embodiment shown in FIG. 2.

While FIG. 3 illustrates the fundamental arrangement of the different members, FIG. 4 shows, in a diagramatic side elevation, the arrangement of the various members of a preferred form of execution of the second embodiment.

Substrate 10 is drawn by means of conveyor rollers 62′ and 62″ from a stock reel (not shown). Substrate 10 runs, first of all, over a horizontally aligned surface 43 of elongated pressure-reaction member 40, and is then drawn to correspond with the shown position of a further surface 41 of pressure beam 40 to point obliquely downwards through stamping station 30. Pressure beam 40 may again be heated. The pair of conveyor rollers 62′ and 62″ draws substrate 10 in steps through stamping station 30. It is apparent that the conveyance, as already mentioned, is interrupted during the actual printing process. The alteration in the direction of the path of substrate 10 at the transition between surfaces 43 and 41 of pressure-reaction member 40 serves a purpose, which is further explained below and which, in addition, brings about a steady position of the substrate in stamping station 30. Blocking-foil 20, coming from a stock reel, is again led through stamping station 30 by means of two pairs of conveyor rollers 64′, 64″ and 66′, 66″.

Between the first pair of conveyor rollers 64′ and 64″ and stamping station 30, lies heating element 70, having a curved surface 74 as depicted in contact with the pigment-free surface 24 of blocking foil 20. At the end of element 70 adjacent stamping station 30, heating element 70 is provided with a projection 72 so that blocking-foil 20 may receive heat until just before reaching stamping station 30.

Printer 50, again, may have the form of a commercial needle-dot printing head. It is aligned with its longitudinal axis perpendicular to surface 41 of pressure-reaction member 40. Its needles act upon free surface 24 of blocking-foil 20. The oblique position of printing block 50, as shown in FIG. 4, corresponding with the slope of surface 41, serves to reduce in the heating of the printing head of printer 50.

The positioning of knife beam 80, as shown in FIG. 4, provides a free deflector edge lying opposite substrate 10 and projects as far as the path from printing block 50 in the region of stamping station 30 so that, directly after passing through stamping station 30, blocking-foil 20 is lifted from substrate 10. The curved run of surface 74 of heating element 70 and the shape, as well as the arrangement, of knife beam 80, lead, in combination with the positions of associated conveyor rollers 64', 64" and 66, 66", to a fundamentally curved path of blocking-foil 20 so that blocking-foil in the region of stamping station 30 is free of flutter.

In conclusion, it may be pointed out that printer 50, which in FIG. 4 moves in the machine frame perpendicularly to the plane of the drawing, does not need to be the preferred needle-printer. Other printing heads may be employed with equal success, to generate the stamping force serially, e.g., character-by-character. Typewheel or chain printers may be mentioned as examples of alternate printers.

The process of the instant invention is predicated on the ability of thin materials to pass the strokes of the printer to another material, to enable the heated pigment to be transferred from the blocking-foil to a preferably heated substrate to provide a clean imprint and a strong bond. The key to the process is, that the printer strikes from 400 to 500 times faster than the printing plate in the hot-stamp printer. This time does not make it possible to heat up the blocking-foil just at the time of impact. The blocking-foil, as indicated, must be preheated to its transfer temperature at a point very close to the point of transfer.

The process is particularly adaptive to printing variable data on apparel and to provide a print that will have the same resistance to washing and dry-cleaning as do commercial hot-stamp processes. Multiple stations can be used for imprinting multiple colors, and to enable the printing of white, gold or silver on black and other dark materials. With respect to the electronics trade, the system provides for the first time, high-quality printing on self-adhesive polyester metalized plastic foils used for rating plates. The imprint will have high resistance to gasoline, oil and cleaning fluids. Again, any number of colors can be printed, and it is feasible to imprint silver on black foil. Multiple modules in sequence can be used not only for multiple-color printing but, by turning over the substrate between two printed modules, both sides of the substrate can be printed with differing information.

What is claimed is:

1. A method of hot-stamp variable printing of a substrate, which method comprises:

(a) providing a substrate to be printed, and a blocking-foil providing on one surface thereof facing the substrate, a layer of pigment which is transferrable under applied contact pressure when heated;

(b) preheating the layer of pigment to its transfer temperature a temperature below its melting point sufficient for transfer of pigment to the substrate under subsequent applied contact pressure;

(c) passing the substrate and blocking-foil having the preheated pigment surface, between a variable stamping indicia printer and a pressure-reaction member for receiving a printing force forming a stamping zone; and (d) serially transferring pigment as indicia from the blocking-foil to the substrate by contact pressure induced by pressing the blocking-foil having a heated transferrable-pigment surface against the substrate by action of a stamping force applied by movement of the indicia printer toward and against the blocking-foil and substrate.

2. A method as in claim 1 in which a surface of the blocking-foil opposed the surface providing the pigment is brought into contact with the pressure-reaction member which is heated, and in which the substrate is serially printed in the stamping station by pressure action of the printer against the surface of the substrate opposed the substrate surface to be printed.

3. A method as in claim 1 in which the substrate is heated.

4. A method as in claim 2 in which the substrate is heated.

5. A method as in claim 1 in which the surface of the blocking-foil opposed the pigmented surface is brought into contact with the printer and is heated in the feed-path to the printer to enable indicia transfer to a point directly before reaching the stamping zone, while the surface thereof to remain unprinted is in contact with the pressure-reaction member.

6. A method as in claim 5 in which the pressure-reaction member is heated.

7. A method as in claim 1 in which the pigment is preheated up to a temperature directly below the melting point of the pigment.

8. A method as in claim 5 in which the pigment is preheated up to a temperature directly below the melting point of the pigment.

9. A method as in claim 1 in which heat energy is constantly provided to the blocking-foil until the blocking-foil reaches the pressure-reaction member.

10. A method as in claim 2 in which heat energy is constantly provided to the blocking-foil until the blocking-foil reaches the pressure-reaction member.

11. A method as in claim 5 in which heat energy is constantly provided to the blocking-foil until the blocking-foil reaches the pressure-reaction member.

12. A method as in claim 4 in which heat energy is constantly provided to the blocking-foil until the blocking-foil reaches the pressure-reaction member.

13. A process as claimed in claim 1 in which the indicia are in the form of serially-printed dots.

14. A process as claimed in claim 1 in which the indicia are characters.

15. A method of hot-stamp variable printing of a substrate, which apparatus comprises:

(a) providing a substrate to be printed and a blocking-foil providing on one surface thereof a layer of pigment which is transferrable under applied contact pressure when heated;

(b) preheating the layer of pigment to its transfer temperature a temperature below its melting point sufficient for transfer of pigment to the substrate under subsequent contact pressure;

(c) feeding the substrate and blocking-foil having the preheated pigment surface between a variable stamp indicia printer having a printer head and a pressure-reaction member for receiving a printing force forming a stamping zone; and (d) serially transferring pigment indicia from the blocking-foil to the substrate by contact pressure induced by pressing the blocking-foil having a heated pigment surface against the substrate by action of the stamping force formed by movement of the printer head toward the pressure-reaction member and against the blocking-foil and substrate, said indicia being applied by movement of the printer head transverse to the direction of feed of the substrate and blocking-foil to the stamping station and while feed through the stamping station is interrupted.

16. A method as in claim 15 in which a surface of the blocking-foil opposed the surface providing the pigment is brought into contact with the pressure-reaction member which is heated, and in which the substrate is serially printed in the stamping station by pressure action of the printer against the surface thereof opposite the substrate surface to be printed.

17. A method as in claim 15 in which the surface of the blocking-foil opposed the pigmented surface is brought in contact with the printer and is heated in the feedpath to the printer to enable indicia transfer to a point directly before reaching the stamping zone, while the surface of the substrate to remain unprinted is in contact with the pressure-reaction member.

18. A method as in claim 15 in which the substrate is heated.

19. A method as in claim 16 in which the substrate is heated.

20. A method as in claim 17 in which the substrate is heated.

21. A method as in claim 15 in which pigment is preheated up to a temperature directly below the melting point of the pigment.

22. A method as in claim 15 in which heat energy is constantly provided to the blocking-foil until the blocking-foil reaches the pressure-reaction member.

23. A process as claimed in claim 15 in which the indicia are in the form of serially-printed dots.

24. A process as claimed in claim 15 in which the indicia are characters.

* * * * *